(12) United States Patent
Schulte et al.

(10) Patent No.: US 6,863,183 B2
(45) Date of Patent: *Mar. 8, 2005

(54) SHALE SHAKER (75) Inventors: David L. Schulte, Broussard, LA (US);
Charles N. Gridhar, Houston, TX (US)

(73) Assignee: Varco I/P, Inc., Houston, TX (US)

( * ) Notice: Subject to any disclaimer, the term of this patent is extended or adjusted under 35 U.S.C. 154(b) by 207 days.

This patent is subject to a terminal disclaimer.

(21) Appl. No.: 10/169,484
(22) PCT Filed: Oct. 19, 2001
(86) PCT No.: PCT/GB01/04667
§ 371 (c)(1), (2), (4) Date: Sep. 16, 2002
(87) PCT Pub. No.: WO02/40186
PCT Pub. Date: May 23, 2002

(65) Prior Publication Data
US 2003/0047493 A1 Mar. 13, 2003
US 2004/0238414 A9 Mar. 13, 2003

Related U.S. Application Data

(62) Division of application No. 09/716,176, filed on Nov. 17, 2000, now Pat. No. 6,371,301.

(51) Int. Cl.[7] .................................................. B07B 1/00
(52) U.S. Cl. ....................................... 209/405; 210/314
(58) Field of Search ................................. 209/401, 408, 209/405, 411, 412, 333, 373, 391, 392, 397; 210/767, 332, 348, 499, 314, 384, 388, 389

(56) References Cited

U.S. PATENT DOCUMENTS

| 964,897 A | 7/1910 | Bryant |
| 1,438,783 A | 12/1922 | Pessell |
| 2,089,548 A | 8/1937 | Frantz et al. |

(List continued on next page.)

FOREIGN PATENT DOCUMENTS

| GB | 2.085.745 A | * | 5/1982 | ........... B01D/33/00 |
| GB | 2144679 A | | 3/1985 | |

OTHER PUBLICATIONS

New Screening Development, U.S. Appl. No. 4,634,535; Flo Trend Systems, Inc. 1989.

Filtration & Separation, The Container Filter, Flo Trend Systems, Inc. 1989.

(List continued on next page.)

*Primary Examiner*—Donald P. Walsh
*Assistant Examiner*—Mark Beauchaine
(74) *Attorney, Agent, or Firm*—Guy McClung (57) ABSTRACT

A shale shaker for separating material, said shale shaker comprising a basket (100) for supporting a screen assembly and a collection receptacle, the basket comprising two side walls (102), an end wall (103) and an opening in the bottom of said basket (100), said basket (100) having means (109, 110) to support screen assemblies for substantially covering said opening characterized in that said basket (100) further comprises separating means (104,105,106)in or on any of said walls (102,103) for separating material. Preferably, further comprising directing means for directing separated material therefrom into said collection receptacle. The invention also provides a method for separating material using the shale shaker of the invention, a basket of the shale shaker of the invention and screen assemblies used in the shale shaker of the invention.

29 Claims, 7 Drawing Sheets

U.S. PATENT DOCUMENTS

| | | | |
|---|---|---|---|
| 2,648,441 A | 8/1953 | Soldan | |
| 2,910,183 A | 10/1959 | Hayes | 210/315 |
| 3,747,770 A | 7/1973 | Zentix | 210/402 |
| 3,815,473 A | 6/1974 | Jones, Jr. | 91/248 |
| 3,929,642 A | 12/1975 | Ennis et al. | 210/113 |
| 3,970,549 A | 7/1976 | Ennis et al. | 209/341 |
| 4,033,865 A | 7/1977 | Derrick, Jr. | 209/275 |
| 4,064,051 A | 12/1977 | Wehner | 210/389 |
| 4,065,382 A | 12/1977 | Derrick, Jr. | 209/313 |
| 4,085,776 A | 4/1978 | Derrick, Jr. | 137/561 A |
| 4,446,022 A * | 5/1984 | Harry | 210/388 |
| 4,526,121 A | 7/1985 | Shudo et al. | 114/73 |
| 4,575,421 A | 3/1986 | Derrick et al. | 209/397 |
| 4,613,432 A | 9/1986 | Racine et al. | 209/254 |
| 4,634,535 A | 1/1987 | Lott | 210/780 |
| 4,762,610 A | 8/1988 | Freissle | 209/397 |
| 4,819,809 A | 4/1989 | Derrick | 209/275 |
| 4,840,728 A | 6/1989 | Connolly et al. | 209/405 |
| 4,857,176 A | 8/1989 | Derrick et al. | 209/392 |
| 4,882,054 A | 11/1989 | Derrick et al. | 210/389 |
| 5,045,184 A * | 9/1991 | Arkles | 209/405 |
| 5,211,291 A | 5/1993 | Kelley et al. | 209/680 |
| 5,221,008 A | 6/1993 | Derrick, Jr. et al. | 209/269 |
| 5,248,043 A | 9/1993 | Dorn | 209/399 |
| 5,330,057 A | 7/1994 | Schiller et al. | 209/392 |
| 5,332,101 A | 7/1994 | Bakula | 209/493 |
| 5,417,793 A | 5/1995 | Bakula | 156/308.2 |
| 5,417,858 A | 5/1995 | Derrick et al. | 210/388 |
| 5,417,859 A | 5/1995 | Bakula | 210/388 |
| 5,494,173 A | 2/1996 | Deister et al. | 209/326 |
| 5,614,094 A | 3/1997 | Deister et al. | 210/388 |
| 5,636,749 A | 6/1997 | Wojciechowdki | 209/403 |
| 5,641,070 A | 6/1997 | Seyffert | 209/314 |
| 5,690,826 A * | 11/1997 | Cravello | 210/384 |
| 5,720,881 A | 2/1998 | Derrick et al. | 210/308 |
| 5,783,077 A | 7/1998 | Bakula | 210/388 |
| 5,811,003 A | 9/1998 | Young et al. | 210/388 |
| 5,868,929 A | 2/1999 | Derrick et al. | 210/388 |
| 5,876,552 A | 3/1999 | Bakula | 156/308.2 |
| 5,921,399 A | 7/1999 | Bakula et al. | 209/272 |
| 5,944,993 A | 8/1999 | Derrick et al. | 210/388 |
| 5,958,236 A | 9/1999 | Bakula | 210/388 |
| 6,000,556 A | 12/1999 | Bakula | 210/388 |
| 6,004,461 A | 12/1999 | Harris | 210/241 |
| 6,053,332 A | 4/2000 | Bakula | 210/388 |
| 6,059,119 A | 5/2000 | Davis | 209/233 |
| 6,161,700 A | 12/2000 | Bakula | 209/401 |
| 6,220,448 B1 | 4/2001 | Bakula et al. | 209/392 |
| 6,241,098 B1 | 6/2001 | Schulte et al. | 209/401 |
| 2002/0175111 A1 * | 11/2002 | Crabbe et al. | 209/269 |

OTHER PUBLICATIONS

"The Derrick LP Sandwich Shaker," Derrick Equipment Co., 1981.

"The Future of Fine Screening," Derrick Equipment Co., 1993.

"Derrick Pyramid Screens," Derrick Corp., 1994.

"Derrick Pyramid Screens," Derrick Equipment Co., 1993.

"Layered Shale Shaker Screens Improve Mud Solids Control," Casle et al, World Oil, 1978.

Principles of High Speed Screening and Screen Machine Design, Derrick Mfg. Corp., 1981.

Mud Equipment Manual, Brandt et al, Handbook 3, Shale Shakers, Brandt et al, Gulf Pub. Co., 1976.

* cited by examiner

SHALE SHAKER

RELATED APPLICATION

This is a division of U.S. application Ser. No. 09/716,176 filed Nov. 17, 2000, issued as U.S. Pat. No. 6,371,301 B1 on Apr. 16, 2002; and this application claims priority from PCT Application No. PCT/GB01/04667, Int'l Publication No. WO 02/40186 A1, filed Oct. 19, 2001.

The present invention relates to a shale shaker, a basket therefor, screen assemblies therefor and a method for separating material using a shale shaker of the invention.

Vibratory separators are used in a wide variety of industries to separate materials such as liquids from solids or to grade particles. Typically such separators have a basket mounted in or over a receiving receptacle and vibrating apparatus for vibrating the basket. One or more screens is mounted in the basket. Material to be treated is introduced to the screen(s). Separated material (e.g. liquid and/or smaller solids) flows through the screen(s) into the lower receptacle and separated larger solids (with or without liquid) move down and off the screen(s).

The need for solids control in drilling fluid or "mud" used in hydrocarbon well drilling is well known in the prior art. Drilling mud, typically a mixture of clay and water and various additives, is pumped down through a hollow drill string (pipe, drill collar, bit, etc.) into a well being drilled and exits through holes in a drill bit. The mud picks up cuttings (rock) and other solids from the well and carries them upwardly away from the bit and out of the well in a space between the well walls and the drill string. At the top of the well, the solids-laden mud is discharged over a vibratory separator known as a shale shaker, a device which typically has one or a series of screens arranged in tiered or flat disposition with respect to each other. The prior art discloses a wide variety of vibrating screens, devices which use them, shale shakers, and screens for shale shakers. The screens catch and remove solids from the mud as the mud passes through them. If drilled solids are not removed from the mud used during the drilling operation, recirculation of the drilled solids can create weight, viscosity, and gel problems in the mud, as well as increasing wear on mud pumps and other mechanical equipment used for drilling.

Typically, the screens used with shale shakers are emplaced in a generally horizontal fashion on a generally horizontal bed or support within a basket in the shaker. The screens themselves may be flat or nearly flat (i.e. substantially two-dimensional); or, due to corrugated, depressed, or raised surfaces, are three-dimensional. The basket in which the screens are mounted may be inclined towards a discharge end of the shake shaker. The shale shaker imparts a rapidly reciprocating motion to the basket and hence the screens. Material from which particles are to be separated is poured onto a back end of the vibrating screen. The material generally flows toward the discharge end of the basket. Large particles are unable to move through the screen, remain on top of the screen, and move toward the discharge end of the basket where they are collected. The smaller particles and fluid flow through the screen and collect in a bed, receptacle, or pan beneath the screen.

Shale shaker or screen capacity is typically determined by the position of a "fluid-end point". The fluid end-point is the point where the fluid pool stops on the screen surface near the shaker's discharge end. This is particularly noticeable when the basket is inclined to the discharge end. As the fluid-end point moves closer to the discharge end, discharged solids can become too wet, risking whole mud losses over the screen.

It is advantageous to increase the screen area in a predefined size shale shaker, in order to increase the amount of material to be separated in a given time. It is also advantageous to decrease the weight of material to be separated in the vibratory separator as quickly as possible in order to conserve energy used by the vibratory mechanism and to increase total throughput for the basket is increased.

According to the present invention, there is provided a shale shaker for separating material, said shale shaker comprising a basket for supporting a screen assembly and a collection receptacle, the basket comprising two side walls, an end wall and an opening in the bottom of said basket, said basket having means to support screen assemblies for substantially covering said opening characterised in that said basket further comprises separating means in or on any of said walls for separating material. Preferably, the shale shaker further comprises directing means for directing separated material therefrom into said collection receptacle.

The invention also provides a method for screening material using a shale shaker as claimed in any preceding claim, comprising the steps of introducing material into said basket, whereupon small particles and fluid of the material flows through said separating means in said walls and directed into said collection receptacle.

The invention also provides a screen assembly for a shale shaker comprising a rectangular frame having a first plane on which at least one layer of screen cloth is arranged, characterised in that said rectangular frame comprises a hole or channel at an angle to said first plane. In use, the hole or channel is used to direct separated fluid and/or particles into a collection receptacle.

The invention also provides a screen assembly comprising a perforated plate and at least one layer of screen cloth thereon characterised in that said perforate plate comprises at least one channel therein. In use, the channels are used to direct separated fluid and/or particles into a collection receptacle.

For a better understanding of the present invention, reference will now be made, by way of example, to the accompanying drawings, in which:

FIGS. 7A to 7F are perspective views of respectively a third, fourth, fifth, sixth and seventh embodiment of a basket for a shale shaker in accordance to the present invention;

Figure 1:
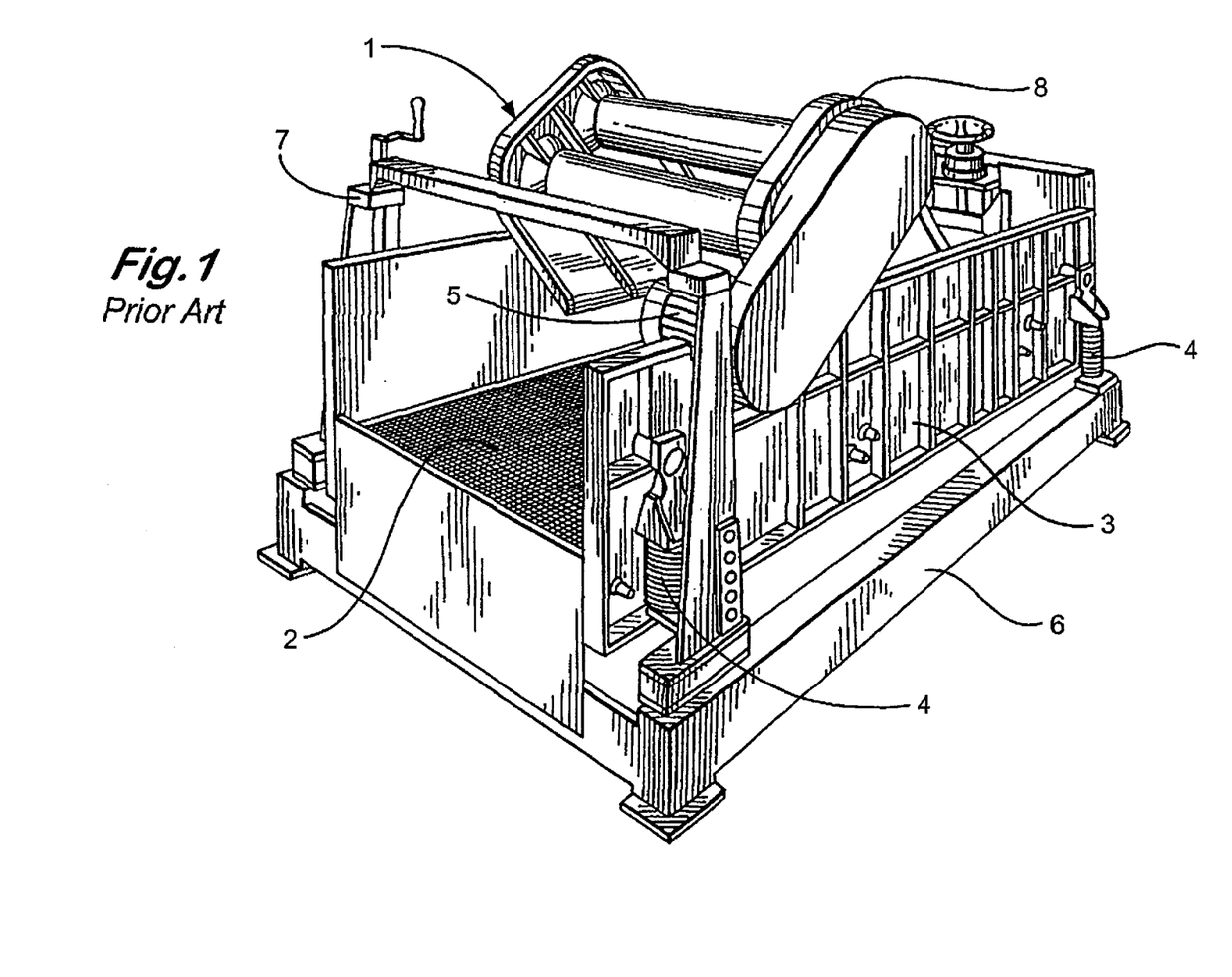
FIG. 1 is a perspective view of a prior art shale shaker.

Referring now to FIG. 1, a prior art shale shaker 1 has a screen assembly 2 mounted in a vibratable screen mounting apparatus known as a "basket" 3. The screen assembly 2 may be any known screen or any combination of screen cloth, coarse mesh, perforate plate with a rigid frame or hook strip. The basket 3 is mounted on four springs 4, two of which are shown and the other two are on the opposite side of the basket 3. The four springs 4 are supported from a frame 6. The basket 3 is vibrated by a motor 5 and interconnected vibrating apparatus 8 which is mounted on the basket 3 for vibrating the basket and the screens. Elevator apparatus 7 provides for raising and lowering of the basket 3 at one end. Typically the basket will be in an inclined, "climb the hill" position (see FIG. 4) so that a pool 9 of liquid is maintained at a first end within the basket. In use, large particles will "climb the hill" towards a discharge end of the shale shaker.

Figure 2:
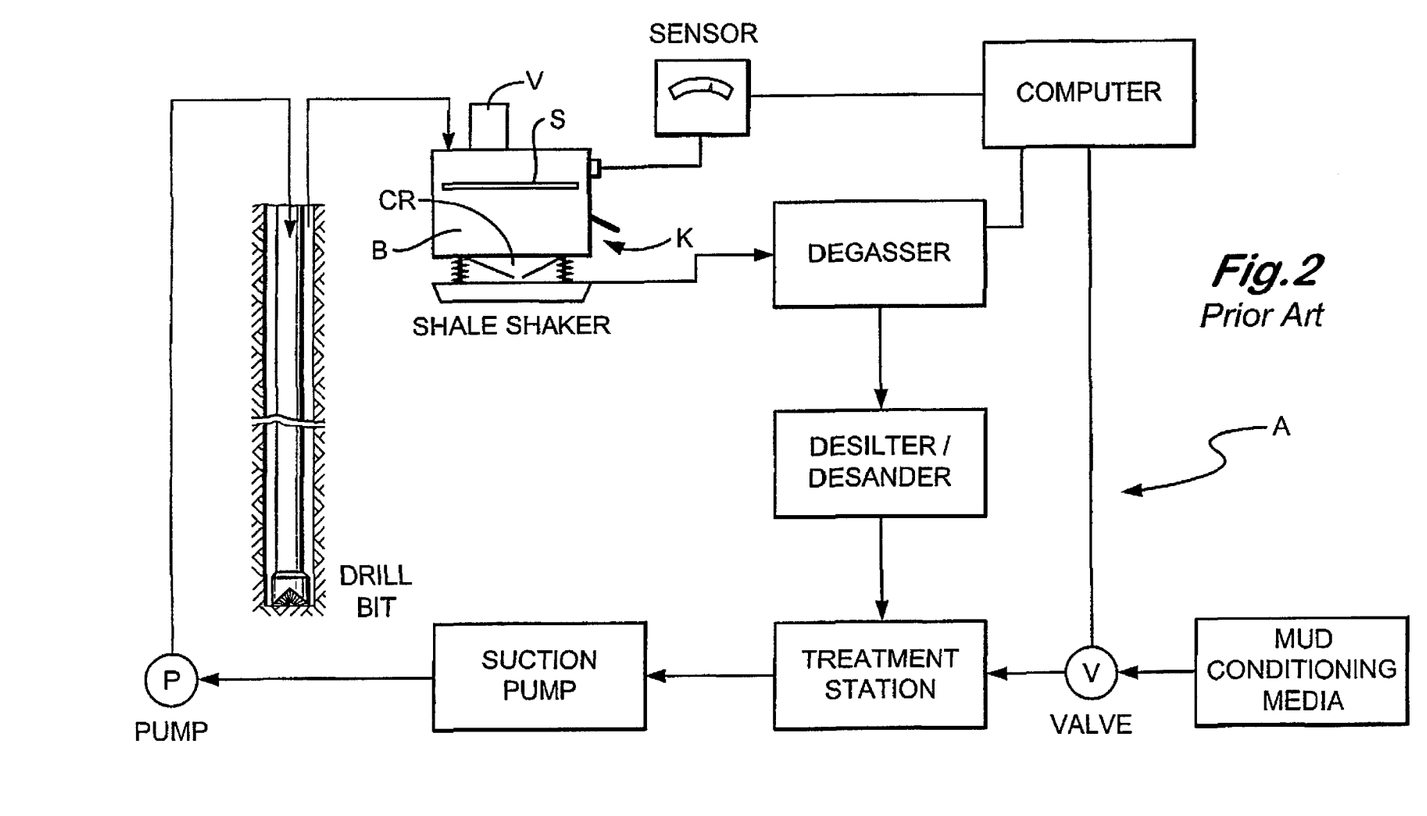
FIG. 2 is a schematic view of a prior art system for separating and treating mud in a well drilling operation.

FIG. 2 discloses one example of a typical prior art shaker system, as shown in U.S. Pat. No. 5,90,645. The system A comprises a shale shaker K having a screen assembly or assemblies S. The screen assemblies S (only one shown) are mounted in a typical shaker basket B and one or more vibratory mechanisms V vibrates the basket B and the screen assemblies S, which are rigidly mounted therein. A collection receptacle CR is arranged beneath the basket B to collect separated mud, which will go on for further processing before being reused. The other components of the system A are as described in U.S. Pat. No. 5,190,645 incorporated fully herein for all purposes.

Figure 3:
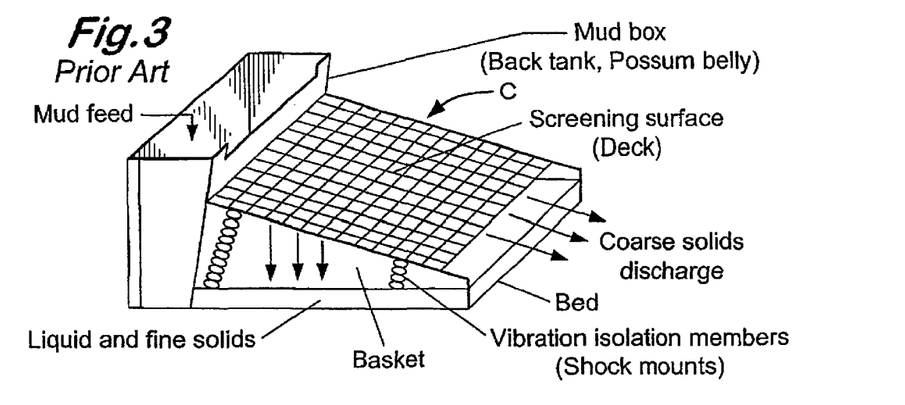
FIG. 3 is a schematic view of part of a prior art shale shaker.

FIG. 3 shows schematically a prior art system C with a Mud Box M, also known as a Back tank or Possum Belly, to distribute the flow to a screen assembly S (only one shown). The screen assembly S is mounted rigidly in a basket (not shown) which is vibrated to assist the throughput of mud and movement of separated solids. The basket (or deck) rests on Vibration Isolation Members, such as helical springs or rubber mounts. The vibration isolation members rest on the support member, which is also used to divert flow as desired, and is called a Bed. There are many deck, basket configurations used depending on the design criteria. The deck, basket, may be flat, horizontal, or mounted at a slope.

On sloped deck units for example, cascade or parallel flow units, the screens may be continuous with one screen covering the entire deck length, or have a divided deck which has more than one screen used to cover the screening surface, or with individual screens mounted at different slopes. On multiple deck units, more than one screen layer may be employed. In a two or three deck unit, the mud passes through one screen before flowing through the second.

The motion of the shaker controls the efficiency of separation, rate of travel of cuttings on the screen, solids separation capacity and fluid capacity. The shape and axial direction of the vibration motion along the deck is controlled by the position of the vibrator relative to the deck and the direction of rotation of the vibrator.

Shale shakers have capacity limits. Exceeding a capacity limit means excessive mud will be discharged over the ends along with the solids and hence, wasted. Capacity limits are typically defined for non-blinded screens. Capacity limits of a shale shaker include:
1. The solids capacity limit is the maximum amount of solids that a device will remove; and
2. The liquid limit—the maximum GPM capacity for various drilling muds.

The solids capacity limit is encountered when drilling soft, gummy formations. Usually the liquid limit controls the minimum size screen that can be used for a given circulation rate. The thicker the mud, the lower the GPM capacity. Open area of the screens and usable area of the screening deck influence this limit. The solids capacity and/or liquid capacity varies with different shaker designs. In practice, the smallest screen size that can be employed without flooding a unit is used.

There is a need for an efficient vibratory separator system which is efficient and cost-effective with increased efficiency, and screen throughput.

Referring now to FIGS. 5A to 5D there is shown a basket 10 for supporting screen assemblies in a vibratory separator such as a shale shaker. The basket 10 has two spaced-apart side walls 12, 14 and an end wall 16 between them. Typical vibrator apparatus 20 is connectible to the basket 10. An end screen assembly 40 is mounted in channels 22, 24 on opposite sides of the end wall 16. Screen mounting apparatus 46 may be any such known apparatus.

In one aspect the channels 22, 24 are open at the top so the screen assembly 40 can be introduced into the space between the channels 22, 24. Optional removable blocks 26, 28 on the interior of the basket hold the screen assembly 40 in place in the channels; and optional crown bars 32 on the screen assembly's exterior provide support for the screen 40. In one aspect each crown bar 32 has a rubber part 34 that contacts the screen assembly 40. Screening material of the screen assembly 40 (as on any screen according to the present invention) may be any suitable known screening material, including, but not limited to one, two, three or more layers of known screening material and/or mesh, two-dimensional or three-dimensional, bonded, glued, connected or unconnected.

The screen assembly 40 may, optionally, have a curved lower portion 42 that corresponds to a curved-shape assumed by screens (not shown) mounted in the basket 10. Crown members (not shown) may be provided to support the screen in the basket 10 in the curved shape.

The screen assembly 40 is emplaced over an opening in the end wall 16. Optionally a sealing gasket 19 or other seal material or seal member is used around the opening 18.

Figure 5A:
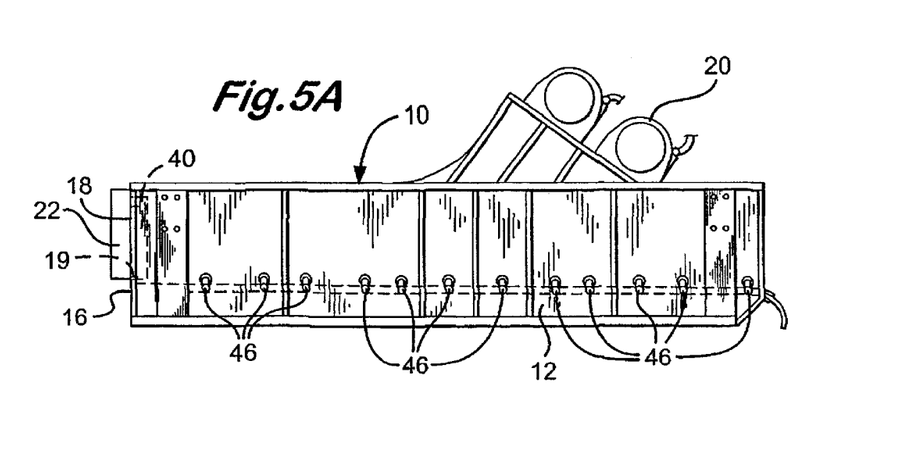
FIG. 5A is a side view of a basket for a shale shaker in accordance with the present invention.
Figure 5B:
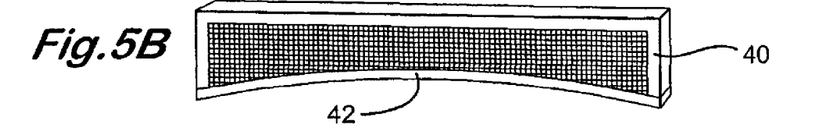
FIG. 5B is a perspective view of a screen assembly of the basket of FIG. 5A.
Figure 5C:
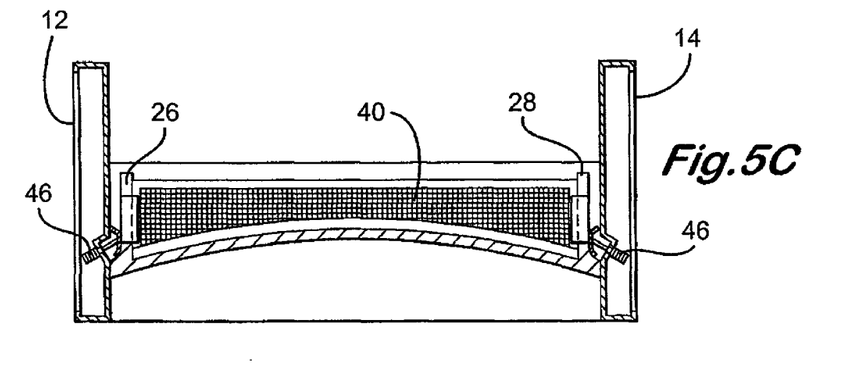
FIG. 5C is an end view of parts of the basket as shown in FIG. 5A incorporating the screen assembly shown in FIG. 5B.
Figure 5D:
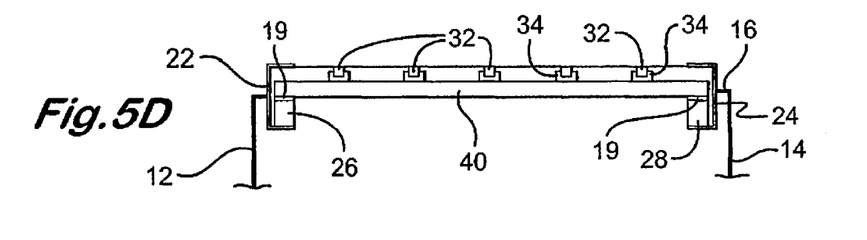
FIG. 5D is a top view of part of the basket of FIG. 5A.
Figure 5E:
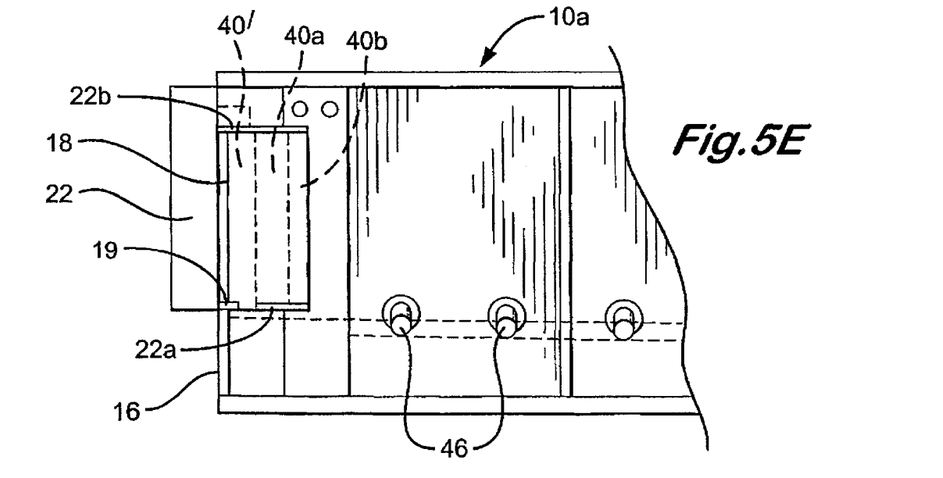
FIG. 5E is a side view of a second embodiment of a basket and screen assembly for a shale shaker in accordance with the present invention.

A basket 10 (and any basket according to the present invention) may be used with any suitable known shaker or separator. FIG. 5E shows another embodiment 10a of a basket 10 with multiple vertical end screens 40', 40a, and 40b supported on lower part 22a of the channel 22 and positioned beneath upper part 22b of the channel 22. Alternatively, the screen assembly may have appropriate frames or other mounting members and/or structure so that they can be bolted in place. The screens 40a and 40b may be like the screen 40' with the screening material as described for the screen assembly 40 (and like numerals in FIGS. 5A and 5E are for like items). Each screen may have similar or different screening material. Two, three, four or more such screens may be used at a basket end and/or side(s) with screens positioned within or outside the basket.

Figure 6A:
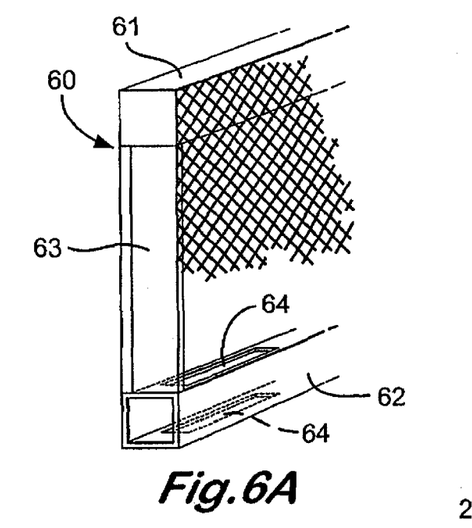
FIG. 6A is a perspective view of a plate for a screen assembly in accordance with the present invention.

FIG. 6A shows part of a tubular frame 60 used as a screen support for screening material for a screen assembly according to the present invention for use in a vibratory separator or shale shaker. The frame 60 has a top member 61 and a bottom member 62. A plurality of cross members 63 (one shown) interconnect the top and bottom members. A screen or screen assembly (not shown) may be arranged vertically against top and bottom members 61 and 64. One, two, three, four, or more holes 64 (or a series of perforations through the bottom member 62) provide for fluid flow through the bottom member 62 (shown as hollow; solid bottom members with one or more holes or perforations may be used). In one aspect the top member also has such a hole or holes 64. Screening material may be adhered or otherwise attached to the front face of the frame and a back plate may be welded or otherwise attached to the rear face of the frame. In use, separated material flows through the screening material and falls or is diverted through holes 64 into a collecting receptacle, such as the one shown in FIG. 2 with reference CR, beneath the basket of the shale shaker.

Figure 6B:
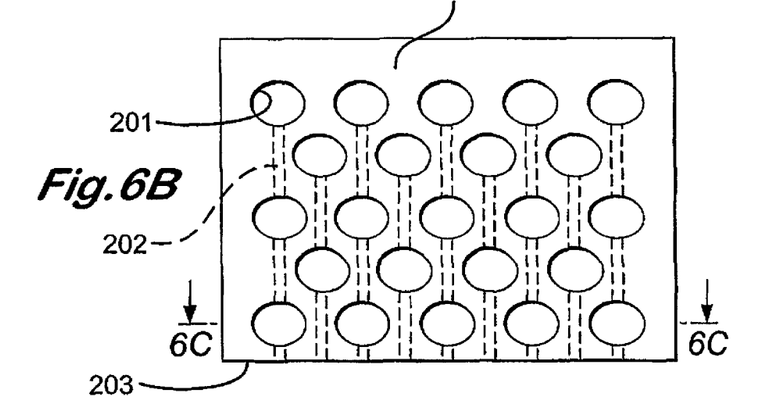
FIG. 6B is a top view of a perforated plate in accordance to the present invention.
Figure 6C:
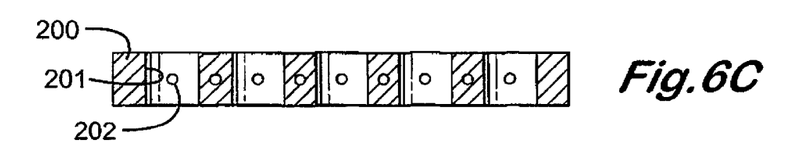
FIG. 6C is a cross-sectional view taken along line 6C—6C of FIG. 6B.

FIGS. 6B and 6C show a perforated plate 200 for supporting screening material (not shown) for a screen assembly for a vibratory separator, such as a shale shaker, particularly for an end wall or side wall of the basket. The perforated plate 200 has a plurality of spaced-apart openings 201 or holes extending through the plate from one surface to the other. A second series of spaced-apart openings 202 or holes extend from the topmost row of openings 201 (as viewed in FIG. 6B) to a bottom side 203 of the plate 200. Openings 202 intersect openings 201 so that fluid flowing into an opening 201 can flow down (as viewed in FIG. 6B) and out from the plate 200, e.g. into a collecting receptacle of a vibratory separator or shale shaker beneath a basket in which is mounted a screen assembly with such a plate.

It is within the scope of this invention for any known perforated plate or perforated member used as a support for a screen assembly which has a known series of spaced-apart perforations, holes, openings, etc. to have a second series of perforations, openings or holes (e.g. but not limited to like the holes 202) at any desired angle to the perforations, holes or openings, etc. through the plate (including, but not limited to at a right angle as shown in FIG. 6B) to conduct fluid through the plate as is done by the plate 200.

Figure 6D:
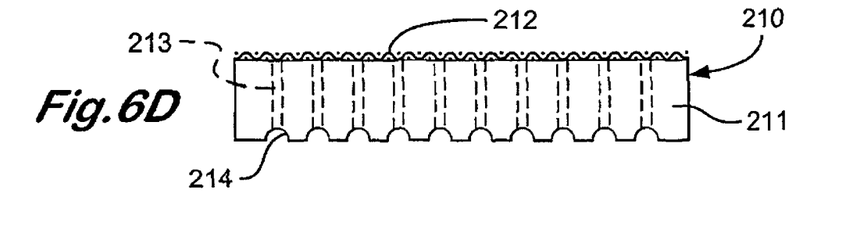
FIG. 6D is a top view of a second embodiment of a perforate plate in accordance with the present invention.

FIG. 6D shows a screen assembly 210 for a vibratory separator, such as a shale shaker, according to the present invention, with a perforated plate 211 for supporting screening material 212 on the plate 211, particularly for an end screen or side basket screen according to the present invention as described herein. The perforated plate 211 has a plurality of spaced-apart openings 213 or holes extending through the plate from one surface to the other. A series of spaced-apart grooves 214 or notches extend from one side of the plate 211 to the other and intersect the openings 213 so that fluid flowing into an opening 213 can flow down and out from the plate 211, e.g. into a receptacle of a vibratory separator or shale shaker beneath a basket in which is mounted a screen assembly with such a plate. There may be multiple holes 213 under each hole 213 as viewed in FIG. 6D across the plate's surface. The screening material 212 may be any disclosed herein and/or any known in the art.

It is within the scope of this invention for any known perforated plate or perforated member used as a support for a screen assembly which has a known series of spaced-apart perforations, holes, openings, etc. to have a second series of grooves or notches (e.g. but not limited to like the grooves 214) at any desired angle to the perforations, holes or openings, etc. through the plate (including, but not limited to at a right angle as shown in FIG. 6D) to conduct fluid down the plate as is done in the plate 211.

Figure 7A:
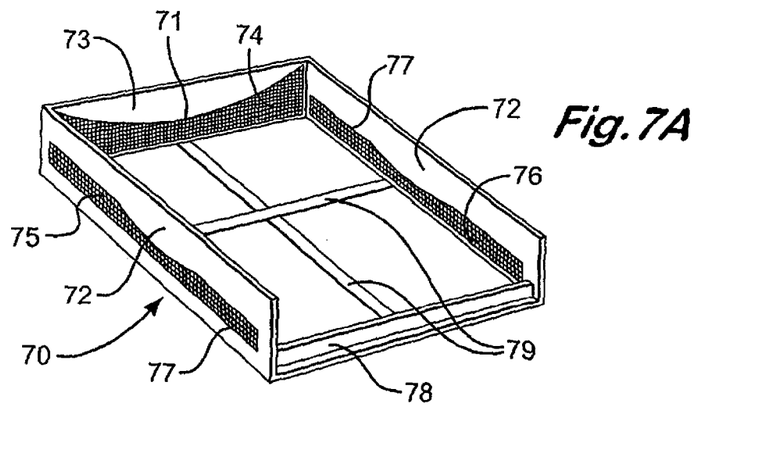

FIG. 7A shows a basket 70 with side walls 72, end wall 73, and cross-braces 79 on which screen assemblies for treating fluid introduced into the basket are to be mounted. End wall 73 has an end screen assembly 74 over an end opening 71 for treating fluid introduced to the basket 70. Side screen assemblies 75, 76 are mounted over side openings 77 in the side walls 72. An end brace 78 is interconnected between side walls 72 at an exit end of the basket 70 (opposite the other end at which fluid is introduced into the basket).

Figure 7B:
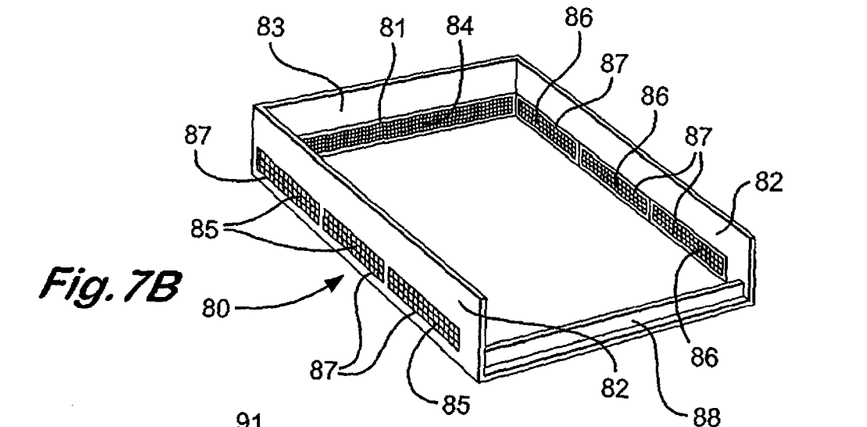

FIG. 7B shows a basket 80 with side walls 82, end wall 831, in which screen assemblies for treating fluid introduced into the basket are to be mounted. End wall 83 has an end screen assembly 84 over an end opening 81 for treating fluid introduced to the basket 80. Side screen assemblies 85, 86 are mounted over side openings 87 in the side walls 82. An end brace 88 is interconnected between side walls 82 at an exit end of the basket 80 (opposite the other end at which fluid is introduced into the basket).

Figure 7C:
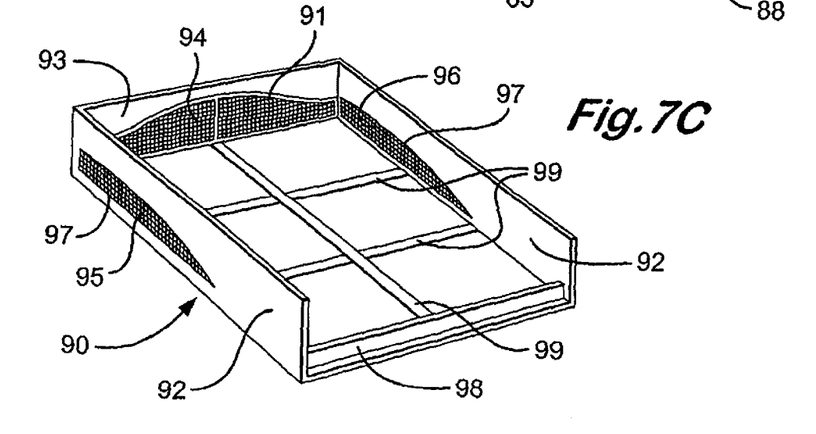

FIG. 7C shows a basket 90 with side walls 92, end wall 93, and cross-braces 99 on which screen assemblies for treating fluid introduced into the basket are to be mounted. End wall 93 has an end screen assembly 94 over an end opening 91 for treating fluid introduced to the basket 90. Side screen assemblies 95, 96 are mounted over side openings 97 in the side walls 92. An end brace 98 is interconnected between side walls 92 at an exit end of the basket 90 (opposite the other end at which fluid is introduced into the basket).

Figure 7D:
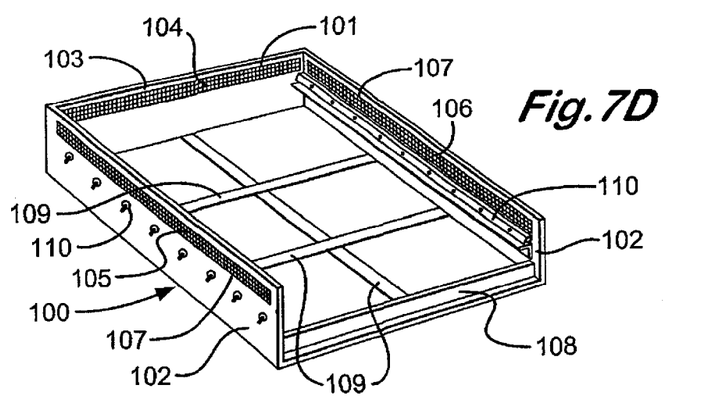

FIG. 7D shows a basket 100 with side walls 102, end wall 103, and cross-braces 109. End wall 103 has an end screen assembly 104 over an end opening 101 for treating fluid introduced to the basket 100. Side screen assemblies 105, 106 are mounted over side openings 107 in the side walls 102. An end brace 108 is interconnected between side walls 102 at an exit end of the basket 100 (opposite the other end at which fluid is introduced into the basket) Mounting apparatus 110 (any known in the art) is used to mount screen assemblies in the basket 100.

Figure 7E:
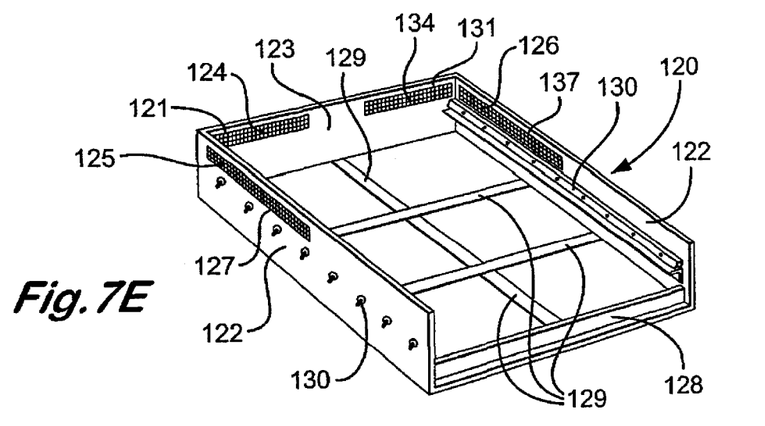

FIG. 7E shows a basket 120 with side walls 122, end wall 123, and cross-braces 129. End wall 123 has end screen assemblies 124, 134 over end openings 121, 131 for treating fluid introduced to the basket 120. Side screen assemblies 125, 126 are mounted over side openings 127, 137 in the side walls 122. An end brace 128 is interconnected between side walls 122 at an exit end of the basket 120 (opposite the other end at which fluid is introduced into the basket). Mounting apparatus 130 (any known in the art) is used to mount screen assemblies in the basket 120.

Figure 4:
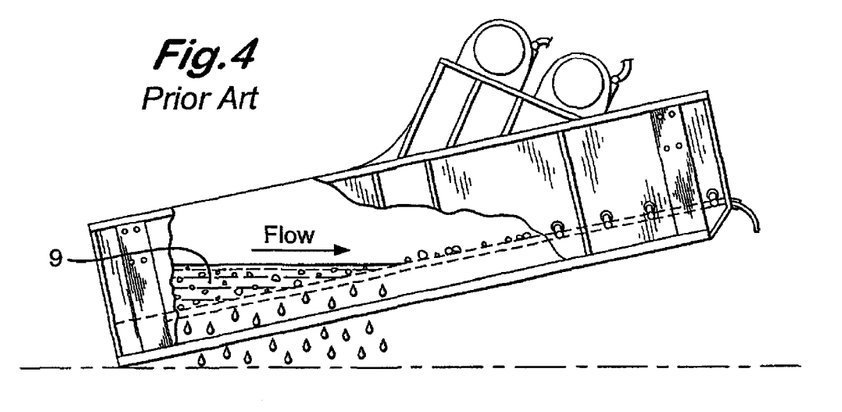
FIG. 4 is a side cross-sectional view of a prior art basket for a shale shaker as shown in FIG. 1, in use.
Figure 7F:
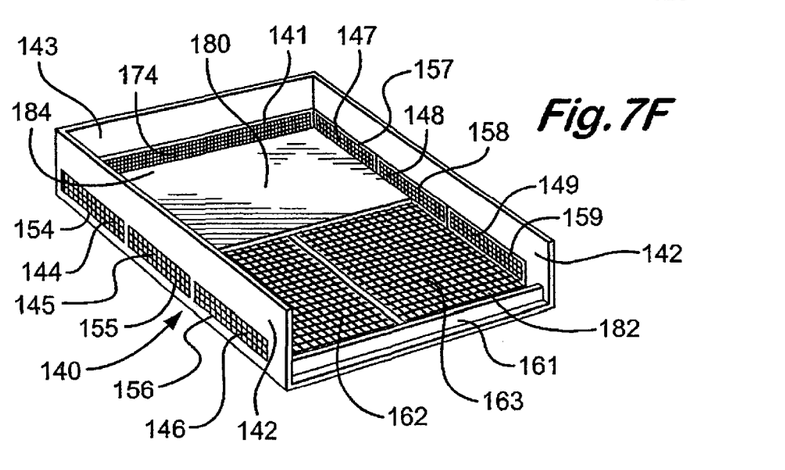

FIG. 7F shows a basket 140 with side walls 142, end wall 143, and screen assemblies 162, 163 mounted on the basket for treating fluid introduced into the basket. End wall 143 has an end screen assembly 174 over an end opening 141 for treating fluid introduced to the basket 140. Side screen assemblies 144, 145, 146, 147, 148, 149 are mounted over side openings 154, 155, 156, 157, 158, 159 in the side walls 142. An end brace 168 is interconnected between side walls 142 at an exit end 182 of the basket 140 (opposite the other end at which fluid is introduced into the basket). A solid sheet or plate 180 is mounted in the basket at the fluid introduction end 184 opposite the solids exit end 182. The solid sheet or plate 180 performs no fluid treatment function of separating components of a fluid introduced into the basket 140. The end screen 174 and side screen assemblies and/or side screen portions adjacent the solid sheet or plate 180 do perform a fluid component separation function. It is within the scope of this invention for the solid sheet or plate to be sized so that it underlies a pond or pool (e.g. as shown in FIG. 4, item 9). It is also within the scope of this invention for the solid sheet or plate to extend from the end wall 143 toward the exit end 182 six inches, one foot, eighteen inches, two feet, thirty inches, three feet, forty two inches, four feet, or any desired amount. alternatively, the sheet or plate 180 may have a series of slits, slots, holes, openings and/or perforations therethrough so that the sheet or plate 180 does perform a fluid component separation function; and, in one such embodiment, the slits, slots, holes, openings and/or perforations are of a size like that of a finest screen mesh on top of a screen used for the screen assemblies 162, 163. Any screen or screen assembly may be used in the basket 140. Any sheet or plate 180 may be used in any known basket or any basket according to the present invention.

Figure 8:
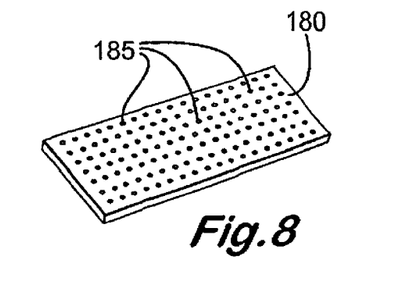
FIG. 8 is a perspective view of a plate or sheet for a basket in accordance with the present invention.

FIG. 8 shows a plate 180 with a plurality of perforations 185 therethrough.

Vertically "stacked" screen assemblies in the walls of the basket may all be mounted within the basket; outside the basket; or one or more of them may be mounted within the basket and one or more of them mounted outside the basket—with appropriate mounting members, gaskets, seals, seal members, and/or bolts and nuts so that fluid flows through the screens and then exits from an outermost screen.

For an opening not covered by a screen, a blocking plate or member is releasably and sealingly installed over the opening(s) to close off the opening to flow.

The shale shaker of the invention is one of any type of vibratory separator which may incorporate the features of the claims.

What is claimed is:

1. A screen mounting basket for a vibratory separator for separating components of material introduced into the basket, the vibratory separator including a collection receptacle beneath the basket, the basket comprising
   two opposed spaced-apart side walls having first ends and second ends, the first ends spaced-apart by an end wall connected to each of the side walls,
   a basket bottom opening between the two spaced-apart side walls,
   at least one end opening through the end wall,
   at least one end screen over the at least one end opening,
   at least one basket screen over the basket bottom opening, and
   the at least one end screen and the at least one basket screen for separating a component from the material, material flowing through the at least one basket screen not flowing through the at least one end screen, the separated component flowing into the collection receptacle.

2. The screen mounting basket of claim 1 wherein the basket has at least one side opening in one of the two spaced-apart sides and at least one side basket screen is mounted over the at least one side opening for separating a component from the material.

3. The screen mounting basket of claim 1 wherein the at least one basket screen is a two-dimensional screen.

4. The screen mounting basket of claim 1 wherein the at least one basket screen is a three-dimensional screen.

5. The screen mounting basket of claim 1 wherein the at least one end screen is within the basket.

6. The screen mounting basket of claim 1 wherein the at least one end screen is releasably secured to the basket.

7. The screen mounting basket of claim 1 wherein the at least one side basket screen is within the basket.

8. The screen mounting basket of claim 1 wherein the at least one side basket screen is releasably secured to the basket.

9. The screen mounting basket of claim 1 wherein the at least one end screen is a plurality of end screens adjacent each other end-to-end over the at least one end opening.

10. The screen mounting basket of claim 1 wherein the at least one end screen is a plurality of end screens positioned vertically adjacent and parallel to each other over the at least one end opening.

11. The screen mounting basket of claim 1 wherein the at least one basket screen is a plurality of basket screens adjacent each other end-to-end over the basket bottom opening.

12. The screen mounting basket of claim 1 wherein the at least basket screen is a plurality of basket screens positioned vertically adjacent and parallel to each other over the basket bottom opening.

13. The screen mounting basket of claim 1 wherein the at least one end screen opening is plurality of adjacent end openings and the at least one end screen is a plurality of end screens each over an opening of the plurality of end openings.

14. The screen mounting basket of claim 1 wherein the at least one side basket opening is plurality of side basket openings and the at least one side basket screen is a plurality of side basket screens each over an opening of the plurality of side basket openings.

15. The screen mounting basket of claim 1 wherein the material introduced to the basket is drilling fluid with undesirable material therein and the separated component is drilling fluid.

16. The screen mounting basket of claim 1 wherein the at least one end screen has a support with a plurality of openings therethrough suitable for the flow of fluid therethrough, the fluid from the material introduced into the basket, and the at least one end screen having a plurality of fluid conducting channels therein at an angle to the plurality of openings so that fluid flowing into one of the plurality of openings may then flow into one of the plurality of fluid conducting channels and out openings may then flow into one of the plurality of fluid conducting channels and out from the support.

17. The screen mounting basket of claim 16 wherein the support is a frame and the plurality of fluid conducting channels is a plurality of holes in part of the frame.

18. The screen mounting basket of claim 16 wherein the support is a perforated plate, the plurality of openings is a plurality of openings through the perforated plate, and the plurality of fluid conducting channels is a plurality of holes through the perforated plate.

19. The screen mounting basket of claim 16 further comprising
   the basket having a fluid introduction end, and
   a plate mounted in the basket at the fluid introduction end.

20. The screen mounting basket of claim 19 wherein the plate mounted in the basket at the fluid introduction end having a series of holes therethrough for fluid component separation.

21. A screen apparatus for a vibratory separator, the vibratory separator having a basket, the vibratory separator for separating components of material introduced into the basket, the vibratory separator including a collection receptacle beneath the basket, the screen apparatus comprising
   screening material,
   a support,
   the screening material on the support,
   the support having a plurality of openings therethrough suitable for the flow of fluid therethrough, the fluid from the material introduced into the basket, the support having a plurality of fluid conducting channels therein at an angle to the plurality of openings so that fluid flowing into one of the plurality of openings may then flow into one of the plurality of fluid conducting channels and out from the support into the receptacle, and
   wherein the material introduced into the basket is drilling fluid with undesirable material therein and the screen apparatus is for separating drilling fluid from the material.

22. The screen apparatus of claim 21 wherein the plurality of fluid conducting channels comprises a plurality of grooves in a surface of the support, each groove intersecting openings of the plurality of openings in the support.

23. The screen apparatus of claim 21 wherein the support is a frame and the plurality of fluid conducting channels is a plurality of holes in part of the frame.

24. The screen apparatus of claim 21 wherein the support is a perforated plate, the plurality of openings is a plurality of openings through the perforated plate, and the plurality of fluid conducting channels is a plurality of holes through the perforated plate.

25. A screen mounting basket for a vibratory separator for separating components of material introduced into the basket, the vibratory separator including a collection receptacle beneath the basket, the basket comprising two opposed spaced-apart side walls having first ends and second ends, the first ends spaced-apart by an end wall connected to each of the side walls, a basket bottom opening between the two spaced-apart side walls, at least one side basket opening through one of the two spaced-apart side walls, at least one side basket screen over the at least one side basket opening, at least one basket screen over the basket bottom opening, and the at least one side basket screen and the at least one basket screen for separating a component from the material, component material separated by the at least one side basket screen not flowing through the at least one basket screen, the separated component material flowing into the collection receptacle.

26. A vibratory separator system for separating components from a liquid-solid mixture fed to the vibratory separator system, the vibratory separator system comprising a frame, a screen mounting basket on the frame, vibrating apparatus connected to the screen mounting basket for vibrating the screen mounting basket, the screen mounting basket comprising two opposed spaced-apart side walls having first ends and second ends, the first ends spaced-apart by an end wall connected to each of the side walls, a basket bottom opening between the two spaced-apart side walls, basket bottom screening apparatus at the basket bottom opening, at least one basket aperture not through the basket bottom, at least one aperture screen over the at least one basket aperture, and the at least one aperture screen and the bottom screening apparatus for separating a component material from the material introduced into the basket, material flowing through the at least one aperture screen not flowing through the bottom screening apparatus, the separated component material flowing into the collection receptacle, and wherein the liquid-solid mixture is drilling fluid with undesirable material therein and the component separated by the at least one aperture screen is drilling fluid.

27. A method for reducing the weight of material on the bottom screening apparatus of a vibratory separator, the vibratory separator having a screen mounting basket into which the material is introduced, the vibratory separator including a collection receptacle beneath the basket, the basket comprising a plurality of interconnected walls, a basket bottom opening between the walls, basket bottom screening apparatus at the basket bottom opening, at least one basket aperture through one of the walls and not through the basket bottom, at least one aperture screen over the at least one basket aperture, and the at least one aperture screen and the bottom screening apparatus for separating a component material from the material introduced into the basket, the separated component material flowing into the collection receptacle, the method comprising introducing the material into the basket, flowing part of the material through the at least one aperture screen, said part flowing into the receptacle without passing through the bottom screening apparatus.

28. The method of claim 27 wherein the screen mounting basket has a fluid introduction end, and a plate mounted in the basket at the fluid introduction end, the method further comprising flowing material introduced into the basket onto the plate.

29. The method of claim 28 wherein the plate mounted in the basket at the fluid introduction end has a series of holes therethrough for fluid component separation.

* * * * *